United States Patent
Pether et al.

(10) Patent No.: US 6,970,208 B1
(45) Date of Patent: Nov. 29, 2005

(54) BLOCK MOVE ENGINE WITH GAMMA AND COLOR CONVERSIONS

(75) Inventors: David N. Pether, Wokingham (GB); Ivan M. DiPrima, Caversham (GB)

(73) Assignee: LSI Logic Corporation, Milpitas, CA (US)

( * ) Notice: Subject to any disclaimer, the term of this patent is extended or adjusted under 35 U.S.C. 154(b) by 652 days.

(21) Appl. No.: 09/960,572

(22) Filed: Sep. 21, 2001

(51) Int. Cl.$^7$ ............................................. H04N 5/202
(52) U.S. Cl. ...................... 348/674; 348/675; 348/254; 348/649
(58) Field of Search ................................ 348/674, 675, 348/254, 255, 256, 649; 358/518, 519; H04N 5/202, H04N 9/64

(56) References Cited

U.S. PATENT DOCUMENTS

| | | | | |
|---|---|---|---|---|
| 4,564,915 A | * | 1/1986 | Evans et al. ................. | 345/550 |
| 5,311,297 A | * | 5/1994 | Seki et al. .................... | 348/675 |
| 5,552,904 A | * | 9/1996 | Ryoo et al. ................... | 358/518 |
| 5,737,032 A | * | 4/1998 | Stenzel et al. ............... | 348/649 |
| 5,949,496 A | * | 9/1999 | Kim ............................. | 348/645 |
| 5,991,056 A | * | 11/1999 | Takamori .................... | 358/523 |
| 6,201,530 B1 | * | 3/2001 | Thadani et al. ............. | 345/593 |
| 6,727,959 B2 | * | 4/2004 | Eskin .......................... | 348/674 |

OTHER PUBLICATIONS

U.S. Appl. No. 09/960,771—"Integration Of Video Processing Into A Block Move Engine"—Author(s)—David Pether.
U.S. Appl. No. 09/960,578—"SC3000—Graphics—Video sampling structure conversion in BMME"—Author(s)—David Pether.

* cited by examiner

*Primary Examiner*—John Miller
*Assistant Examiner*—Trang U. Tran
(74) *Attorney, Agent, or Firm*—Christopher P. Maiorana, P.C.

(57) ABSTRACT

An apparatus comprising a first circuit and a second circuit. The first circuit may be configured to present a first portion of an output data stream in response to a first portion of an input data stream. The second circuit may be configured to present a second portion of the output data stream in response to a second portion of the input data stream. The apparatus may be configured to perform color and gamma correction on the input data stream to generate the output data stream in response to one or more control signals. In one example, the apparatus may comprise block move engine (BME).

17 Claims, 4 Drawing Sheets

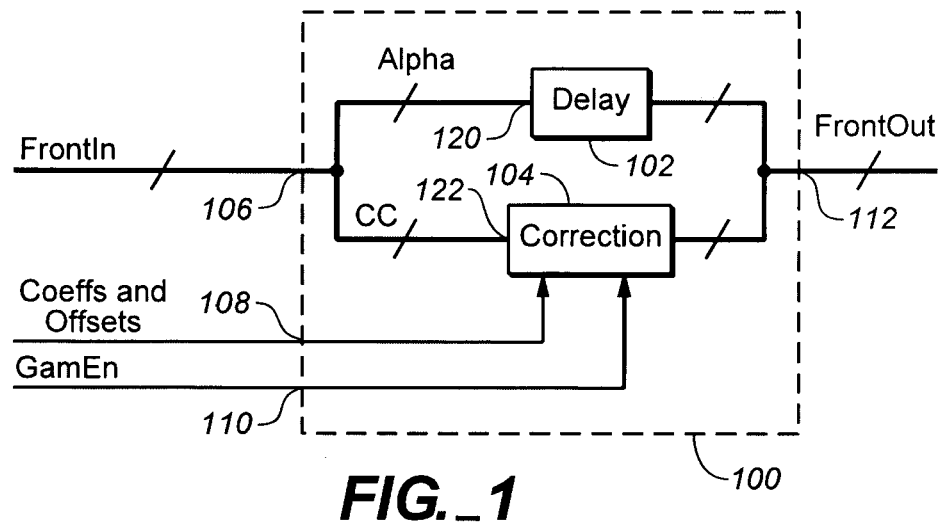
FIG._1
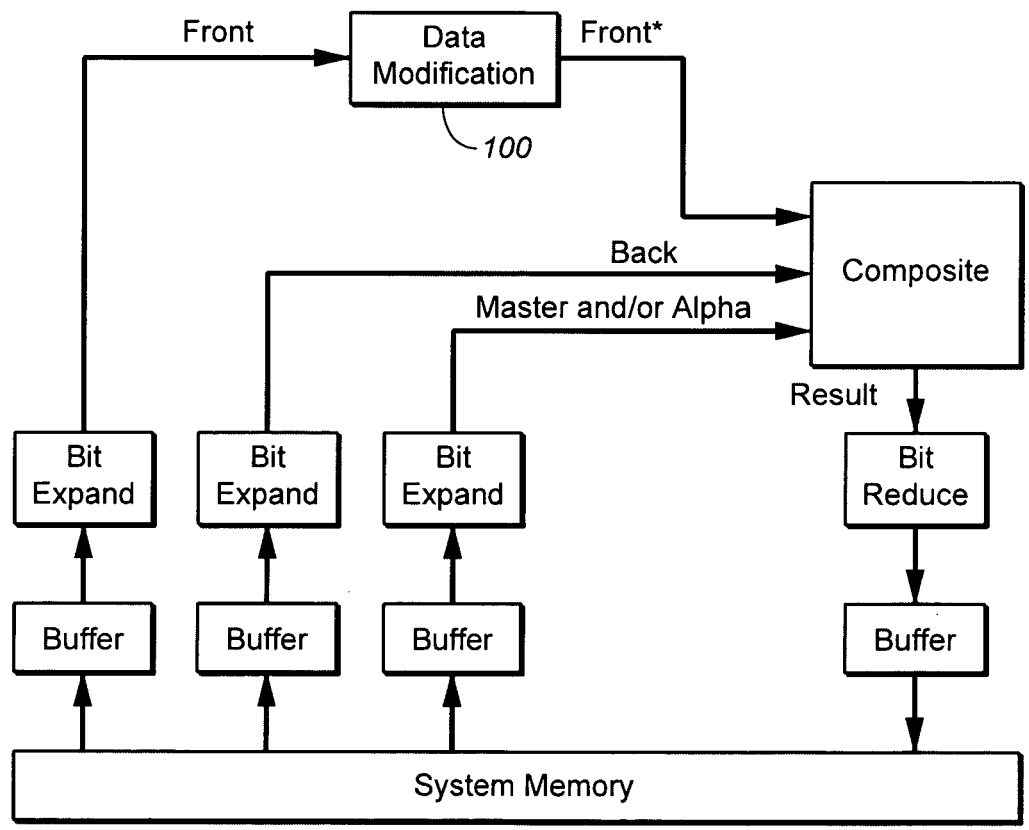
FIG._2

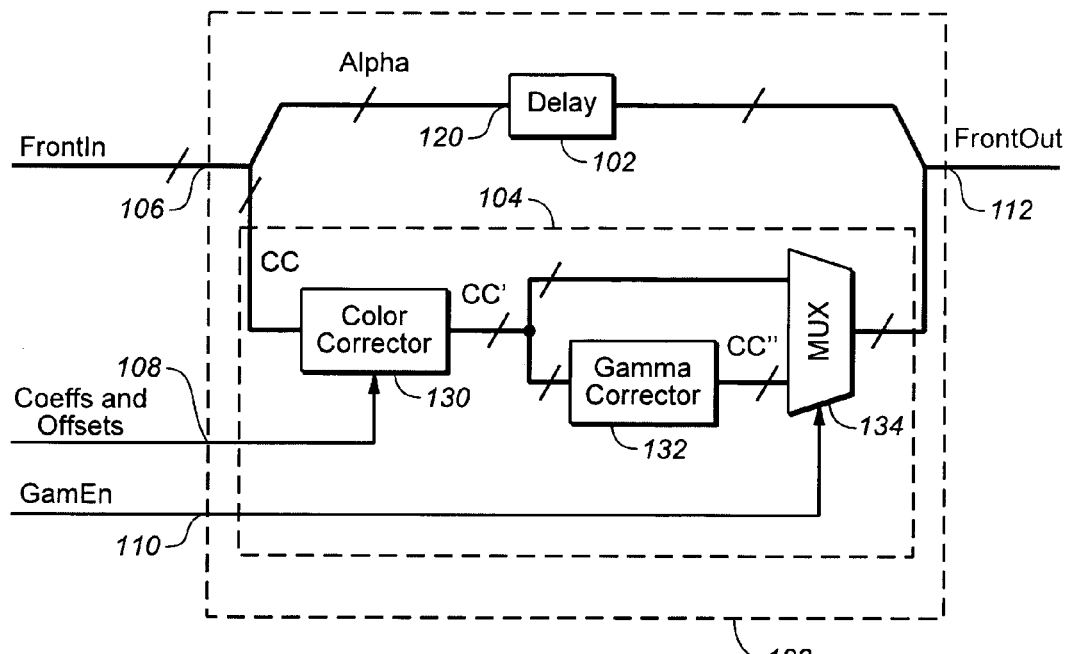
FIG._3
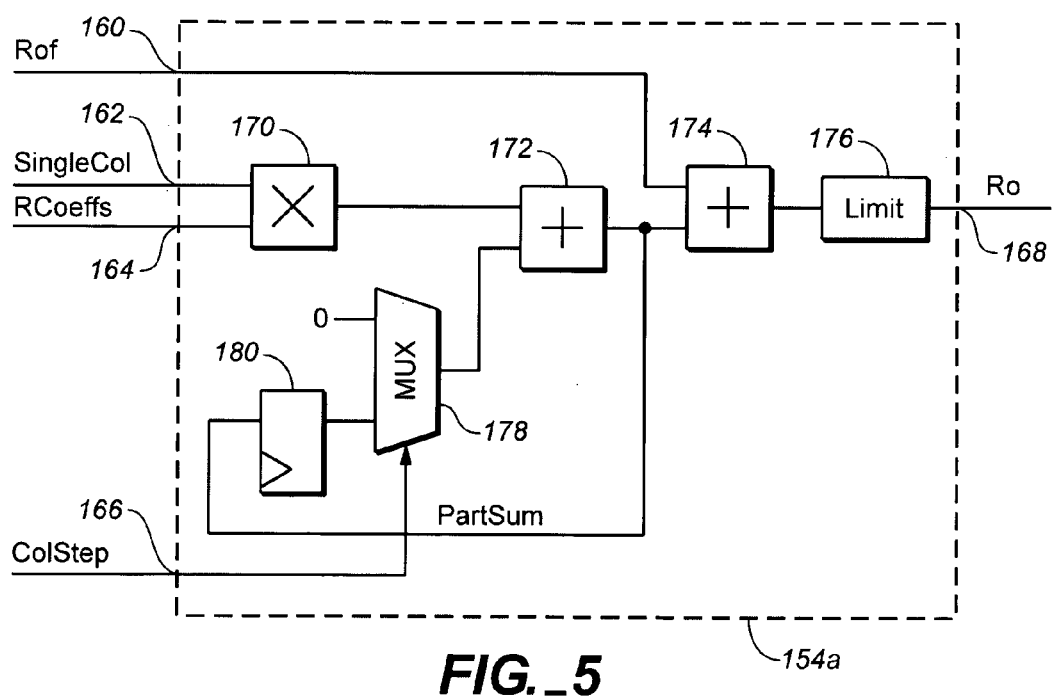
FIG._5

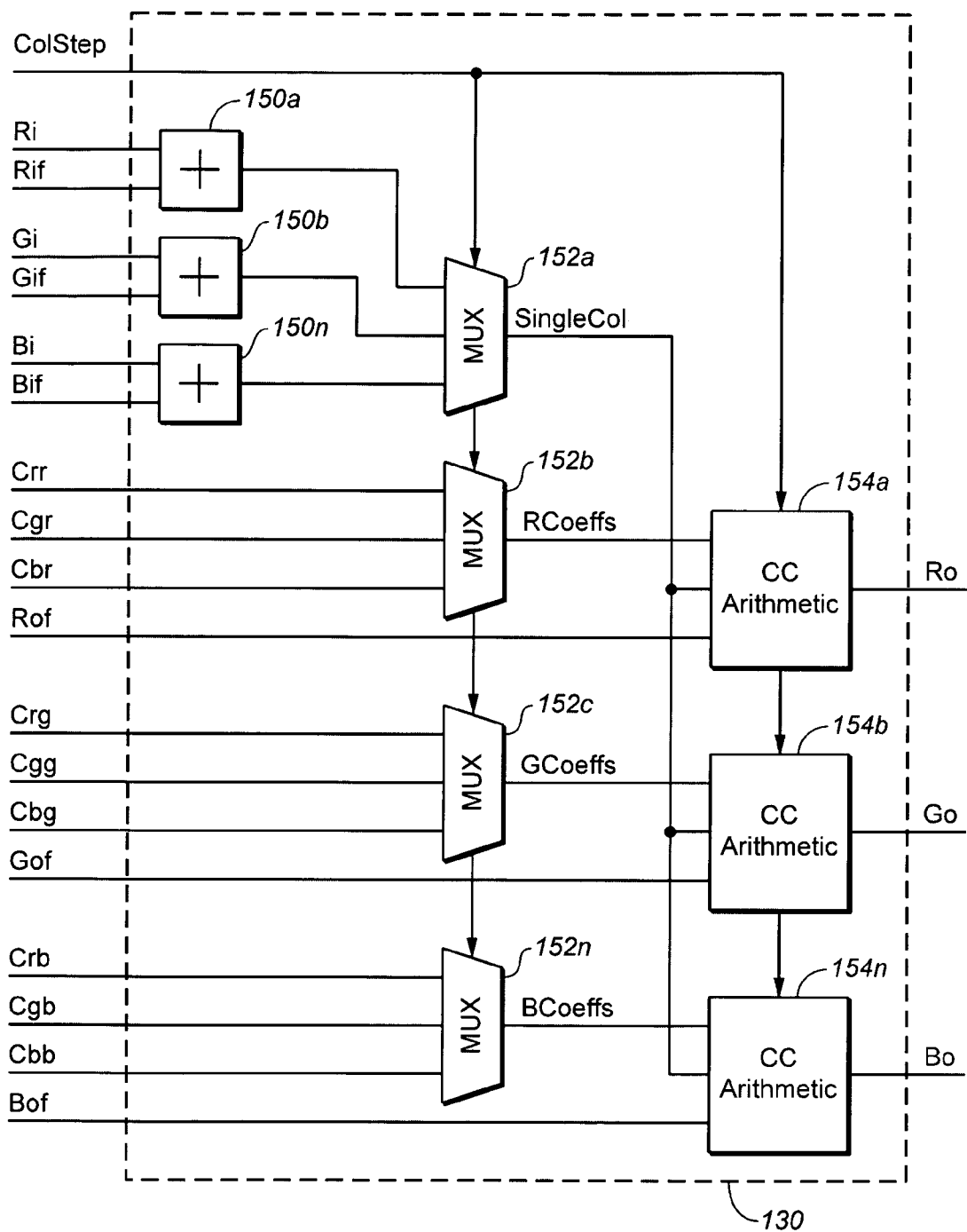
FIG._4

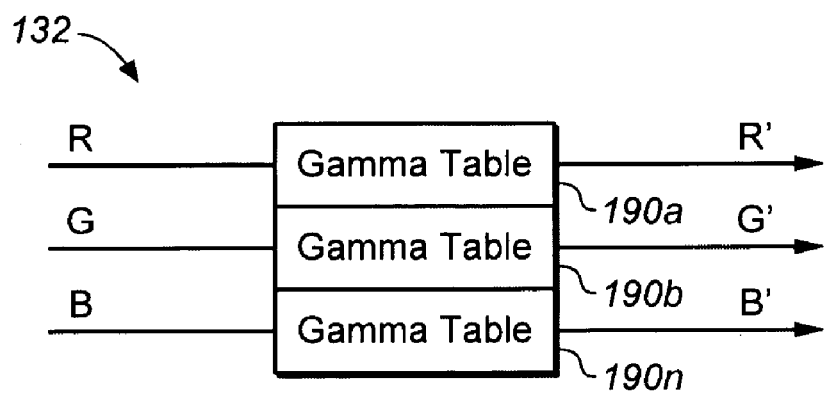
FIG._6
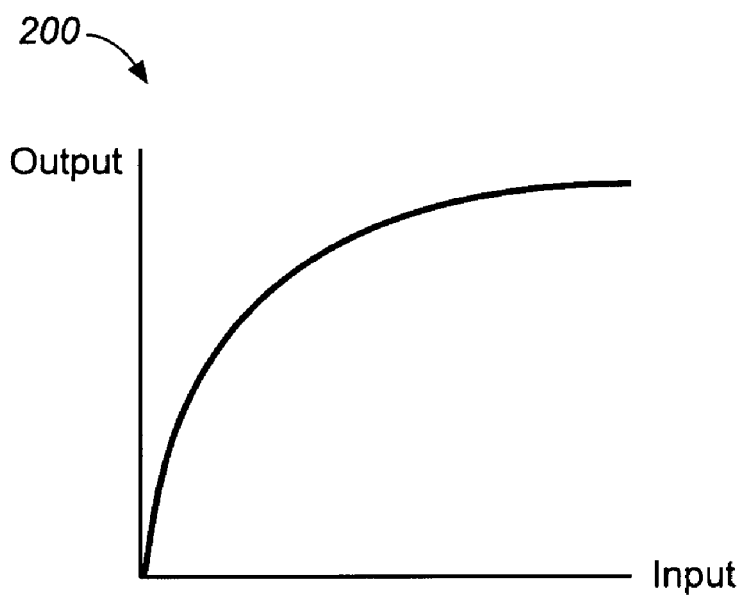
FIG._7

BLOCK MOVE ENGINE WITH GAMMA AND COLOR CONVERSIONS

CROSS REFERENCE TO RELATED APPLICATIONS

The present application may relate to co-pending application Ser. No. 09/960,578 filed concurrently and Ser. No. 09/690,771 filed concurrently, which are each hereby incorporated by reference in their entirety.

FIELD OF THE INVENTION

The present invention relates to a method and/or architecture for implementing block modify and move engines (BMMEs) generally and, more particularly, a method and/or architecture for implementing color and gamma correctors that may be used within the data modification section of a BMME.

BACKGROUND OF THE INVENTION

The implementation of a block move engine (BME) (a bit blitter or blitting engine) for rapidly copying blocks of graphics data from one location in memory to another is generally used for graphics processing. BMEs may be extended to include two or more input data streams of identical size which are combined by a logical composition operation and written back to memory as a single data block. The demand for improvements in graphics speed and resolution and the convergence of video and graphics applications onto common platforms has made it is desirable to incorporate a wider selection of functions within the general structure of a BME.

SUMMARY OF THE INVENTION

The present invention concerns an apparatus comprising a first circuit and a second circuit. The first circuit may be configured to present a first portion of an output data stream in response to a first portion of an input data stream. The second circuit may be configured to present a second portion of the output data stream in response to a second portion of the input data stream. The apparatus may be configured to perform color and gamma correction on the input data stream to generate the output data stream in response to one or more control signals. In one example, the apparatus may comprise block move engine (BME).

The objects, features and advantages of the present invention include providing a method and/or architecture for implementing color and gamma correctors that may be suitable for inclusion within the data modification section of a BMME that may implement color and gamma correction.

BRIEF DESCRIPTION OF THE DRAWINGS

These and other objects, features and advantages of the present invention will be apparent from the following detailed description and the appended claims and drawings in which:

FIG. 1 is a block diagram of a preferred embodiment of the present invention;

FIG. 2 illustrates a context of the present invention;

FIG. 3 is a detailed block diagram of the circuit of FIG. 1;

FIG. 4 is a detailed block diagram of the color corrector circuit of FIG. 3;

FIG. 5 is a detailed block diagram of an example of the color corrector arithmetic circuit of FIG. 4;

FIG. 6 is a detailed block diagram of the gamma corrector circuit of FIG. 3; and FIG. 7 is a graph illustrating an operation of the gamma table.

DETAILED DESCRIPTION OF THE PREFERRED EMBODIMENTS

Referring to FIG. 1, a block diagram of a circuit (or system) 100 is shown in accordance with a preferred embodiment of the present invention. The circuit 100 may provide a color and gamma correction within the data modification section of a block modify and move engine (BMME).

The circuit 100 generally comprises a delay block (or circuit) 102 and a correction block (or circuit) 104. The circuit 100 may have an input 106 that may receive a signal (e.g., FRONTIN), an input 108 that may receive one or more coefficient and/or offset signals (e.g., COEFFS and OFFSETS), an input 110 that may receive a signal (e.g., GAMEN) and an output 112 that may present a signal (e.g., FRONTOUT). A portion of the signal FRONTIN (e.g., ALPHA) may be presented to an input 120 of the delay circuit 102, another portion of the signal FRONTIN (e.g., CC) may be presented to an input 122 of the correction circuit 104. The alpha data ALPHA may be data corresponding to a first color component. The color components data CC may be corresponding to a second color component. The correction circuit 104 may also receive the coefficient signals COEFFS, the offset signals OFFSETS and the signal GAMEN. The delay circuit 102 may present a portion of the signal FRONTOUT and the correction circuit 104 may present another portion of the signal FRONTOUT. The various signals of the present invention may be implemented as single-bit or multi-bit signals.

Color correction and gamma correction may both be valid operations on color components of graphics and video data. However, such correction may not be relevant to alpha data. A bypass path via the delay 102 may be provided for the alpha data ALPHA, when applicable. Delay for color components CC through the correction circuitry 104 may be matched by the delay 102 for the alpha channel ALPHA. The color components CC may be RGB or YUV for most graphics and video operations. However, other appropriate color components may be implemented to meet the design criteria of a particular implementation.

Referring to FIG. 2, a context of the present invention is shown. The details of FIG. 2 are described in co-pending application Ser. No. 09/960,771 filed concurrently.

Referring to FIG. 3, a more detailed diagram of the circuit 100 is shown. In particular, the correction circuit 104 generally comprises a color corrector circuit 130, a gamma corrector circuit 132 and a multiplexer 134. The color corrector circuit 130 may present a signal (e.g., CC') to the gamma corrector circuit 132 and the multiplexer 134. The gamma corrector circuit 132 may also present a signal (e.g., CC") to an input to the multiplexer 134. The signal GAMEN is generally presented to a select input of the multiplexer 134. The gamma corrector circuit 132 may be bypassed via the multiplexer 134. The multiplexer 134 may select either the processed data CC" from the gamma corrector 132 or the bypassed data CC' in response to the enable/control GAMEN. The multiplexer 134 may present a portion of the output 112 by selecting the signal CC' from the color corrector circuit 130 or the signal CC" from the gamma corrector circuit 132. A bypass path for the color corrector circuit 130 may not be necessary, since the correction coefficients COEFFS and offsets OFFSETS may be set to make the color corrector circuit 130 transparent.

The color corrector circuit 130 may implement the equation EQ1:

EQ1:
$$\begin{bmatrix} Ro \\ Go \\ Bo \end{bmatrix} = \begin{bmatrix} Rof \\ Gof \\ Bof \end{bmatrix} + \begin{bmatrix} Crr & Cgr & Cbr \\ Crg & Cgg & Cbg \\ Crb & Cgb & Cbb \end{bmatrix} \left( \begin{bmatrix} Ri \\ Gi \\ Bi \end{bmatrix} + \begin{bmatrix} Rif \\ Gif \\ Bif \end{bmatrix} \right),$$

where the variables Ri, Gi, and Bi are typically the input color components. The variables Ro, Go, and Bo typically correspond to output components. The variables Rif, Gif, and Bif are typically input offsets. The variables Rof, Gof, and Bof are typically output offsets. The variable Crr may be a coefficient that determines a value (e.g., Ri+Rif) which is added to make the variable Ro. The variable Cgr may be a coefficient that determines a value (e.g., Gi+Gif) which is added to make the variable Ro. The variable Crb may be a coefficient that determines a value (e.g., Bi+Bif) which is added to make the variable Ro. In one example, the coefficients and offsets may be signed values. For simplicity, the RGB color format is used for illustrative purposes. However, other color components (e.g., YUV), or a mixture thereof may be implemented to meet the design criteria of a particular implementation.

The resulting output from the equations may be limited to prevent illegal values being propagated to other parts of the circuit 100. For example, extremely high (or positive) values may be clipped to the maximum level and extremely low (or negative) values may be clipped to the minimum.

With sufficient range and accuracy for the coefficients COEFFS and the offsets OFFSETS, and on the intermediate calculation values, corrections to brightness (e.g., offset) and contrast (e.g., gain) on any or all color components may be achieved. Such a configuration may swap between YUV and RGB color spaces in both directions.

In one example, the implementation of the equations may be achieved directly using nine multipliers and multiple adders. Such a configuration may calculate the result quickly. However, a large amount of circuitry may be used. In another example, the implementation of the equations may be achieved using a single multiplier and registers to hold intermediate results. However, such a configuration may be slow and not practical, since the area of the extra registers and multiplexers required outweigh the benefit of cutting down on multipliers. A preferred implementation may implement three multipliers and may be achieved by calculating the results over three clock cycles (to be described in more detail in connection with FIG. 4).

Referring to FIG. 4, a more detailed diagram of the color corrector circuit 130 is shown. The circuit 130 generally comprises one or more summing circuits 150a–150n, one or more multiplexer circuits 152a–152n and one or more arithmetic circuits 154a–154n. The arithmetic circuits 154a–154n may be implemented as color corrector arithmetic circuits. The color corrector circuit 130 is shown receiving a number of input color components, input offsets, and coefficients. The arithmetic circuits 154a–154n may be similar for each of the three color component channels. The signal COLSTEP may be an internally generated signal that may step through the three color components to control the ordering of calculations on the three components.

Under the control of the counter signal COLSTEP, the coefficients and data inputs to the CC arithmetic circuits 154a–154n may be multiplexed such that all three channels R, G and B to (i) generate R data and associated coefficients on the first clock, (ii) generate G data and associated coefficients on the second clock, and (iii) generate B data and associated coefficients on the third clock. Input offset calculations may be performed prior to multiplexing. However, it may be beneficial to multiplex Ri, Gi, Bi and Rif, Gif, Bif pairs to share a single adder. Such a configuration may depend on system performance requirements.

The adder 150a may receive the signal Ri and the signal Rif. The adder 150b may receive the signal Gi and the signal Gif. The adder 150n may receive the signal Bi and the signal Bif. The adders 150a–150n may present outputs to the multiplexer 152a. The multiplexer 152a may have a select input that may receive the signal COLSTEP. The multiplexer 152a may present a signal (e.g., SINGLECOL) in response to the signal COLSTEP and outputs of the adders 150a–150n. The signal SINGLECOL may be presented to the circuits 154a–154n.

The multiplexer 152b may receive the signal Crr, the signal Cgr and the signal Cbr. The multiplexer 152b may have a select input that may receive the signal COLSTEP. The multiplexer 152b may present a signal (e.g., RCOEFFS) in response to the signals Crr, Cgr, Cbr and COLSTEP. The signal RCOEFFS may be presented to the CC Arithmetic circuit 154a. The CC Arithmetic circuit 154a may also receive the signal Rof and generate the signal Ro.

The multiplexer 152c may receive the signal Crg, the signal Cgg and the signal Cbg. The multiplexer 152c may have a select input that may receive the signal COLSTEP. The multiplexer 152c may present a signal (e.g., GCOEFFS) in response to the signals Crg, Cgg, Cbg and COLSTEP. The signal GCOEFFS may be presented to the CC Arithmetic circuit 154b. The CC Arithmetic circuit 154b may also receive the signal Gof and generate the signal Go.

The multiplexer 152n may receive the signal Crb, the signal Cgb and the signal Cbb. The multiplexer 152n may have select input that may receive the signal COLSTEP. The multiplexer 152n may present a signal (e.g., BCOEFFS) in response to the signals Crb, Cgb, Cbb and COLSTEP. The signal BCOEFFS may be presented to the CC Arithmetic circuit 154n. The CC Arithmetic circuit 154n may also receive the signal Bof and generate the signal Bo.

Referring to FIG. 5, a more detailed diagram of the CC arithmetic circuit 154a is shown. The CC Arithmetic circuits 154b and 154n may have similar implementations. The circuit 154a may have an input 160 that may receive the signal Rof, an input 162 that may receive the signal SINGLECOL, an input 164 that may receive the signal RCOEFFS, an input 166 that may receive the signal COLSTEP and an output 168 that may present the signal Ro.

The circuit 154a generally comprises a circuit 170, a circuit 172, a circuit 174, a circuit 176, a circuit 178 and a circuit 180. The circuit 170 may be implemented as a multiplication circuit. The circuits 172 and 174 may be implemented as adder circuits. The circuit 176 may be implemented as a limit circuit. The circuit 178 may be implemented as a multiplexer circuit. The circuit 180 may be implemented as a register circuit.

The multiplier 170 may be configured to calculate a single term of the matrix multiplication on each clock cycle. The outputs may be added together by storing intermediate sums (e.g., PARTSUM) in the register 180. After three clock cycles, the value PARTSUM may contain the full result.

A first input of the multiplexer 178 may receive an output from the adder circuit 172 (through the register circuit 180). A second input of the multiplexer 178 may receive a digital "0". A select input of the multiplexer 178 may receive the signal COLSTEP. The multiplexer 178 may ensure that a "0" gets added to the first multiplier result of each group of three multiplies. Such a configuration may effectively clear the register 180 from one pixel calculation to the next. The output offset may then be added to the result with the final value Ro being limited by the limiter 176 to remove illegal values.

Referring to FIG. 6, a more detailed diagram of the gamma corrector circuit 132 is shown. The gamma corrector circuit 132 generally comprises a number of gamma tables 190a–190n. An input R is modified by the gamma table 190a to present an output R'. Similarly, an input G is modified by the gamma table 190b to present an output G'. An input B is modified by the gamma table 190n to present an output B'. The gamma tables 190a–190n may be implemented as similar gamma look-up tables.

Each of the gamma look-up tables 190a–190n may be implemented for one of the color components RGB or YUV (although it may not be necessary to perform gamma correction on YUV). The tables 190a–190n may be implemented as a ROM. However, the tables 190a–190n may be implemented as another appropriate type memory element in order to meet the design criteria of a particular implementation. However, the gamma look-up tables may be configured to convert the data according to the equation EQ2:

$$EQ2: Output = K*(Input/J)^{1/\gamma}$$

, where K and J are constants which depend on how the RGB values are represented numerically in the system, and $\gamma$ is the constant gamma correction factor (typically between 2.2 and 2.4). FIG. 7 shows a typical diagram of a transfer function 200 of the gamma table 132. However, modifications to the transfer function may be made to meet the design criteria of a particular implementation.

While the invention has been particularly shown and described with reference to the preferred embodiments thereof, it will be understood by those skilled in the art that various changes in form and details may be made without departing from the spirit and scope of the invention.

What is claimed is:

1. The apparatus comprising:
a first circuit configured to present a first portion of an output data stream in response to a first portion of an input data stream; and
a second circuit configured to present a second portion of said output data stream in response to a second portion of said input data stream, wherein (i) said apparatus is configured to perform color and gamma correction on said input data stream to generate said output data stream in response to one or more control signals and (ii) said second circuit comprises (a) a color corrector circuit configured to generate a first intermediate signal in response to said second portion of said input data stream, (b) a gamma corrector circuit configured to generate a second intermediate signal in response to said first intermediate signal, and (c) a multiplexer configured to present either said first intermediate signal or said second intermediate signal in response to said control signals.

2. The apparatus according to claim 1, wherein said apparatus comprises a block move engine (BME).

3. The apparatus according to claim 1, wherein said first circuit comprises a delay circuit.

4. The apparatus according to claim 1, wherein said second circuit comprises a correction circuit.

5. The apparatus according to claim 1, wherein said control signals comprise:
one or more coefficient signals.

6. The apparatus according to claim 1, wherein said control signals comprise:
one or more offset signals.

7. The apparatus according to claim 1, wherein said control signal comprises:
one or more enable signals.

8. The apparatus according to claim 1, wherein said input data stream comprises video and graphics data.

9. The apparatus according to claim 2, wherein said BME comprises a block modify and move engine (BMME).

10. The apparatus according to claim 2, wherein said BME is further configured to perform color and gamma conversion.

11. An apparatus comprising:
means for generating a first portion of an output data stream in response to a first portion of an input data stream; and
means for generating a second portion of said output data stream in response to a second portion of said input data stream, wherein (i) said apparatus is configured to perform color and gamma correction on said input data stream to generate said output data stream in response to one or more control signals and means for generating said second portion comprises (a) a color corrector circuit configured to generate a first intermediate signal in response to said second portion of said input data stream, (b) a gamma corrector circuit configured to generate a second intermediate signal in response to said first intermediate signal, and (c) a multiplexer configured to present either said first intermediate signal or said second intermediate signal in response to said control signals.

12. A method for providing color and gamma conversion, comprising the steps of:
(A) generating a first portion of an output data stream by delaying a first portion of an input data stream, wherein step (A) further comprises (i) color correcting a second portion of said input data stream, (ii) gamma correcting said second portion of said input data stream, and (iii) bypassing said gamma correcting step; and
(B) generating a second portion of said output data stream in response to a second portion of said input data stream, wherein said method performs color and gamma correction on said input data stream to generate said output data stream in response to one or more control signals.

13. The method according to claim 12, wherein said control signals comprise:
one or more coefficient signals.

14. The method according to claim 12, wherein said control signals comprise:
one or more offset signals.

15. The method according to claim 12, wherein said control signal comprises:
one or more enable signals.

16. The method according to claim 12, wherein said input data stream comprises video and graphics data.

17. A block modify and move engine (BMME) configured to perform the steps of claim 12.

* * * * *